J. BANNIHR.
Velocipede-Sled.
No 65,633.  Patented June 11, 1867.
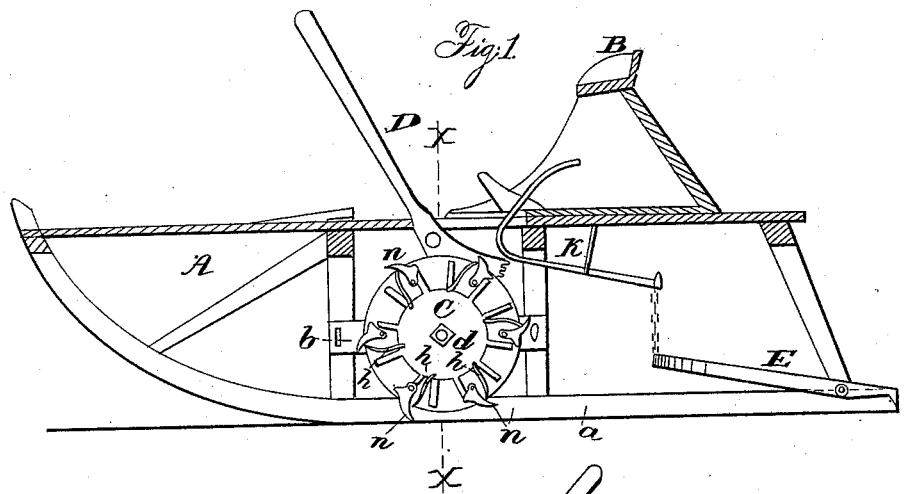
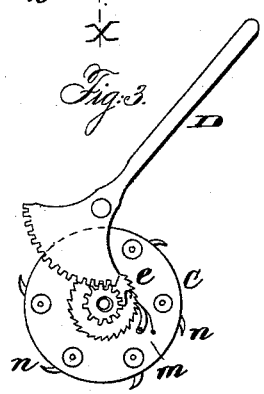
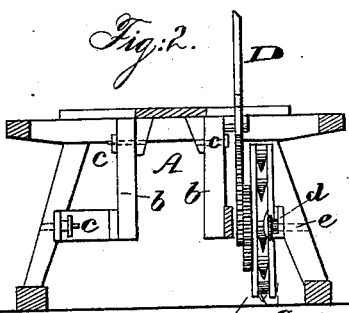

United States Patent Office.

JOHN BANNIHR, OF HEMPSTEAD, NEW YORK.

Letters Patent No. 65,633, dated June 11, 1867.

---

IMPROVEMENT IN VELOCIPEDE SLED.

---

The Schedule referred to in these Letters Patent and making part of the same.

---

TO ALL WHOM IT MAY CONCERN:

Be it known that I, JOHN BANNIHR, of Hempstead, in the county of Queens, and State of New York, have invented a new and improved Velocipede Sled; and I do hereby declare that the following is a full, clear, and exact description thereof, which will enable others skilled in the art to make and use the same, reference being had to the accompanying drawings forming part of this specification, in which—

Figure 1 is a vertical longitudinal section through one of the side-wheels of my invention.

Figure 2, a detached view of the gearing and lever for operating one of the wheels.

Figure 3, a vertical cross-section, taken in the line $x\ x$, fig. 1.

Similar letters of reference indicate corresponding parts.

The nature of this invention consists in connecting a hand-power mechanism with a sled for propelling it on ice, as a velocipede, the movement being effected by levers worked by the person sitting in the sled, which operate on sharp-toed feet, placed in side-wheels, which catch in the ice to propel it forward, as hereinafter particularly described.

A represents an ordinary sled, with a seat, B. Under the top of the sled, inside of each of the runners $a\ a$, is a vertical disk or wheel, C, with its plane in the line of the runners, hung in a frame, $b$, that is made adjustable up and down by the bolts $c\ c$ that secure it to the sled passing through vertical slots in the frame. On the axis $d$ of each of the wheels C is a ratchet-wheel, $e$, and a pinion, $s$. A lever, D, passes through the top of the sled, to which it is pivoted, and engages the toothed segment-arm $g$ on its lower end with the pinion $s$ to turn the wheel C in one direction by means of a spring pawl, $m$, pivoted on the side of the wheel. Both the ratchet-wheel $e$ and the pinion $s$ are loose on the axis $d$, while the wheel C is fast on it, and thus, when either of the levers D is pulled backward by a person in the seat B, the spring pawl $m$ will catch in the ratchet-wheel $e$, and turn the wheel C to propel the sled, while the ratchet-wheel and pinion will stand when the lever is pushed forward, and the wheel C will be inoperative. The wheel C is formed of an inside and outside plate or head, upon which heads is hung, near the periphery of the wheel, a series of sharp feet or claws $n\ n$, having their points directed to the rear end of the sled. These claws are so formed and arranged that when the wheel C is turned by the lever D, they will drop down and project a little outside of the periphery of the wheel to catch in the ice and propel the sled forward, but when the lever D is pushed forward the claws $n\ n$ will then rise within the periphery and offer no resistance to the movement of the sled forward by the impulse it received from the previous action of the lever when pulled backward. In order to make the action of the claws quicker in retiring within the periphery of the wheel, an India-rubber spring, $h$, is attached to each claw $n$, to pull it upward when the action on the wheel ceases. Both levers are worked together for moving in a straight course on the ice, but for turning, one only is moved at a time. To stop the sled quickly, a hook-brake, E, is provided in the rear of the sled, to be acted on by the foot of the driver, on a lever, $k$, which strikes the hooks of the brake into the ice.

Having thus described my invention, what I claim as new, and desire to secure by Letters Patent, is—

The claws $n$ pivoted on wheels C, on each side of a sled, in combination with the levers D, or their equivalent, for rotating the wheels, constructed and operating substantially as described for the purpose herein set forth.

The above specification of my invention signed by me this 21st day of March, 1867.

JOHN BANNIHR.

Witnesses:
WM. F. MCNAMARA,
ALEX. F. ROBERTS.